United States Patent
Iwata et al.

[19]

[11] Patent Number: 5,903,365
[45] Date of Patent: *May 11, 1999

[54] SHEET CONVEYING APPARATUS WITH A REDUCED LOAD DRIVING SYSTEM

[75] Inventors: Naohiro Iwata, Yokosuka; Minoru Yokoyama, Yokohama; Yuji Nakano, Kawasaki; Shunji Kawashima, Wako; Hideyuki Terashima, Sagamihara, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/946,010

[22] Filed: Oct. 7, 1997

Related U.S. Application Data

[63] Continuation of application No. 08/621,583, Mar. 26, 1996, abandoned.

[30] Foreign Application Priority Data

Mar. 28, 1995 [JP] Japan .................................. 7-069248

[51] Int. Cl.[6] .............................. H04N 1/00; H04N 1/40; B65H 5/00
[52] U.S. Cl. .......................................... 358/498; 358/496
[58] Field of Search ............................. 355/99; 358/483, 358/496, 497, 498

[56] References Cited

U.S. PATENT DOCUMENTS

| | | | |
|---|---|---|---|
| 4,975,787 | 12/1990 | Ijuin et al. ........................ | 358/496 X |
| 5,070,415 | 12/1991 | Matsumoto ............................. | 358/482 |
| 5,125,047 | 6/1992 | Ito et al. ............................. | 358/496 X |
| 5,267,058 | 11/1993 | Sata ..................................... | 358/498 |
| 5,420,701 | 5/1995 | Terashima et al. .................... | 358/498 |
| 5,539,538 | 7/1996 | Terao ................................... | 358/498 |

FOREIGN PATENT DOCUMENTS

| | | |
|---|---|---|
| 0 485 975 A2 | 5/1992 | European Pat. Off. . |
| 0 659 009 A2 | 6/1995 | European Pat. Off. . |
| 2-63369 | 3/1990 | Japan . |
| 6-217073 | 8/1994 | Japan . |

OTHER PUBLICATIONS

Patent Abstracts of Japan; Japanese Patent Publication No. 06217073; Aug. 5, 1994.

Patent Abstracts of Japan; Japanese Patent Publication No. 02063369; Mar. 2, 1990.

*Primary Examiner*—Fred L. Braun
*Attorney, Agent, or Firm*—Fitzpatrick, Cella, Harper & Scinto

[57] ABSTRACT

A sheet conveying apparatus and an original reading apparatus according to the present invention can reduce a load of a drive system for rotating a convey rotary member and can be made compact. The apparatus includes an original convey roller rotatably supported by a frame, and a contact sensor holder rockably held by a contact sensor rotation shaft regulated in a thickness-wise direction of an original by a contact sensor holder rotation shaft holding portion of the frame and adapted to hold a second contact sensor in a confronting relation to the original convey roller. The second contact sensor is urged against the original convey roller by an urging spring.

13 Claims, 5 Drawing Sheets

SHEET CONVEYING APPARATUS WITH A REDUCED LOAD DRIVING SYSTEM

This application is a continuation of application Ser. No. 08/621,583 field Mar. 26, 1996, now abandoned.

BACKGROUND OF THE INVENTION

1. Field of the Invention

The present invention relates to a sheet conveying apparatus for conveying a sheet such as an original, a recording sheet and the like, and more particularly, it relates to an original reading apparatus used with a facsimile system and the like.

2. Related Background Art

An example of a conventional original reading apparatus will be explained with reference to FIGS. 6 and 7. In FIG. 6, the reference numeral 51 denotes an original convey roller for conveying an original; 52 denotes an image sensor of complete contact type (referred to as "contact sensor" or "CS" hereinafter) acting as a reading device for reading image information on the original; 53 denotes a holder for locking and holding the CS 52; and 54 denotes an urging means for urging the CS 52 against the original convey roller through the holder 53. The holder 53 has a rotary support portion 53a for attaching the holder 53 to a body of the apparatus for a rocking movement, and a guide portion 53b for guiding the holder when the holder is engaged by the body of the apparatus.

When the original convey roller 51 is rotated in a direction (original conveying direction) shown by the arrow b, as shown in FIG. 7, in the case where the original 6 is pinched between the original convey roller 51 and the CS 52, the original 6 is subjected to a conveying force F1 (directing toward an original conveying direction shown by the arrow a in FIG. 7) from the original convey roller 51 due to friction between the original convey roller 51 and the original 6 and is also subjected to a resistance force F2 (directing toward a direction opposite to the original conveying direction a) due to friction between the original 6 and the CS 52. When F1>F2, the original 6 is conveyed in the original conveying direction a. To this end, the coefficient $\mu1$ of friction between the original convey roller 51 and the original 6 must be greater than the coefficient $\mu2$ of friction between the original 6 and the CS 52 ($\mu1>\mu2$). In order to surely convey various kinds of originals, a surface of the original convey roller 51 is constituted by elastic material such as rubber.

In the original reading apparatus shown in FIG. 6, when the original 6 is inserted into the apparatus, the original convey roller 51 is rotated in the original conveying direction b by detection of sensor(s) (not shown) and/or by manual input through an operation portion (not shown). When the original 6 is conveyed by the original convey roller 51, due to the friction between the original 6 and the CS 52, the CS 52 and the holder 53 for holding the CS are subjected to a conveying force F12 (in the original conveying direction a) corresponding to the above-mentioned resistance force F2, as shown in FIG. 7. By the way, the positioning of the CS 52 and the holder 53 for holding the CS regarding the original conveying direction a is effected by fitting a U-shaped notch 53c (FIG. 6) of the guide portion 53b of the holder 53 on a shaft 51a of the original convey roller 51.

However, in the above-mentioned conventional example, if there is no original 6 between the original convey roller 51 and the CS 52, as shown in FIG. 6, the CS 52 will be subjected to a conveying force F3 from the original convey roller 51 rotated in the direction b. Since an image information reading surface of the CS 52 is constituted by glass and the surface of the original convey roller 51 is constituted by rubber, the coefficient $\mu3$ of friction between the original convey roller 51 and the CS 52 becomes greater than the friction coefficient $\mu2$ ($\mu3>\mu2$), thereby establishing a relation F3>F2. Accordingly, if there is no original 6 between the original convey roller 51 and the CS 52, the conveying force acting on the CS 52 will be maximized.

Accordingly, if there is no original 6 between the original convey roller 51 and the CS 52, any load acting on an original convey driving system (not shown) such as a motor (drive source) for rotating the original convey roller 51 is also maximized. Since the U-shaped notch 53c of the guide portion 53b of the holder 53 is fitted on the shaft 51a of the original convey roller 51, the holder 53 is subjected to a force F4 (directing toward a direction opposite to the original conveying direction a) same as the above-mentioned conveying force F3 from the rotating shaft 51a of the original convey roller 51. However, in FIG. 6, since the guide portion 53b of the holder 53 is positioned above a point where the conveying force F3 of the original convey roller 51 acts on the CS 52 and the associated holder 53 (i.e., a contact point between the original convey roller 51 and the CS 52), couple of forces for rotating the CS 52 and the associated holder 53 around the rotary support portion 53a in a direction shown by the arrow c in FIG. 6 is generated by the above-mentioned forces F3 and F4.

Due to the generation of the couple of forces, the urging force of the CS 52 against the original convey roller 51 is increased. If such urging force is increased, the conveying force F3 received by the CS 52 from the original convey roller 51 is further increased, with the result that the couple of forces is further increased to further increase the urging force of the CS 52 against the original convey roller 51. As a result, the load acting on the drive system (not shown) of the original reading apparatus is greatly increased.

That is to say, in the arrangement of the conventional apparatus, when there is no original 6 between the original convey roller 51 and the CS 52 and the load acting on the drive system of the original reading apparatus is maximized, since the couple of forces is inevitably generated, thereby further increasing the load. As a result, the motor in the drive system is damaged or is out-of-phase. Further, with the arrangement as mentioned above, in FIG. 6, when an original discharge opening is provided at the left side of the original convey roller 51, it is necessary to reserve a space (for receiving the guide portion 53b) between the original discharge opening and the original convey roller 51, with the result that the entire apparatus is made bulky.

SUMMARY OF THE INVENTION

The present invention aims to eliminate the above-mentioned conventional drawbacks, and an object of the present invention is to provide a sheet conveying apparatus and an original reading apparatus which reduces a load of a drive system for driving a convey rotary member and also is made to be compact.

To achieve the above object, according to the present invention, there is provided a sheet conveying apparatus comprising a rotary member for conveying a sheet and an opposed member (counter member) biased toward the rotary member by a biasing means. The sheet is conveyed between the rotary member and the opposed member by rotation of the rotary member, and when the rotary member is rotated and the opposed member is subjected to a force directing toward a rotational direction of the rotary member due to friction between the rotary member and the opposed member or friction between the sheet and the opposed member, an urging force of the opposed member against the rotary member is decreased.

Further, the present invention provides a sheet conveying apparatus comprising a rotary member supported by a shaft to convey a sheet, and an opposed member rotatable around a rotation shaft and biased toward the rotary member by a biasing means. The sheet is conveyed between the rotary member and the opposed member by rotation of the rotary member, and it comprises a holding member for regulating a position of the rotation shaft of the opposed member in a thickness-wise direction, and a positioning member for regulating a position of the opposed member in a sheet conveying direction. When the rotary member is rotated in a condition that the sheet does not exist between the rotary member and the opposed member, the opposed member is subjected to a force directing toward a rotational direction of the rotary member due to friction between the rotary member and the opposed member so that the opposed member abuts against the positioning member to position the opposed member in the sheet conveying direction, and, couple of forces generated at a contact point between the opposed member and the rotary member and couple of forces generated at a contact point between the opposed member and the positioning member due to the rotation of the rotary member act to separate the opposed member from the rotary member.

The rotation shaft of the opposed member may be located upstream of the rotary member in the sheet conveying direction, or, the position of the rotation shaft of the opposed member may be located toward the opposed member side with respect to the rotary member in a sheet thickness-wise direction.

Further, the sheet conveying apparatus according to the present invention can be incorporated into an original reading apparatus. In this case, the rotary member acts as an original convey rotary member, and the opposed member acts as an original reading means.

With the arrangement as mentioned above, when the conveying force received by the opposed member from the rotary member is great, torque required for rotating the rotary member can be reduced. Further, since the rotation shaft of the opposed member is disposed upstream of the rotary member in the sheet (original) conveying direction, the number of parts provided downstream of the opposed member in the sheet conveying direction can be reduced. In addition, since the position of the rotation shaft of the opposed member is located toward the opposed member side with respect to the rotary member in a sheet thickness-wise direction, the rotation shaft of the opposed member can be disposed within a width of the sheet without interference between the rotation shaft of the opposed member and a rotational action of the opposed member, and a sheet convey path.

Since the sheet conveying apparatus according to the present invention has the above-mentioned construction and operation, if there is no sheet between the rotary member and the opposed member and the load of the convey drive system is great, the load can be decreased. When the sheet exists between the rotary member and the opposed member, the sheet conveying ability of the rotary member is not worsened. Further, since the rotary member and the opposed member can be disposed in the vicinity of a sheet discharge opening of the apparatus, the entire apparatus can be made compact. In addition, since the rotation shaft of the opposed member can be disposed within a sheet path area in a sheet width-wise direction, the entire apparatus can be further made compact.

Further, when the support member for rotatably supporting the rotary member, the holding member for holding the biasing means, the rotation shaft holding member for holding the rotation shaft of the opposed member, and the positioning member for positioning the position of the opposed member in the sheet conveying direction are integrally constructed, the number of parts can be reduced, thereby making the apparatus cheaper. In addition, the original reading apparatus having the above-mentioned sheet conveying apparatus can be made compact by the features of the sheet conveying apparatus itself and can be made cheaper by reducing the number of parts.

DETAILED DESCRIPTION OF THE PREFERRED EMBODIMENTS

Now, a sheet conveying apparatus and an original reading apparatus having such a sheet conveying apparatus according to an embodiment of the present invention will be explained with reference to the accompanying drawings.

Figure 1:
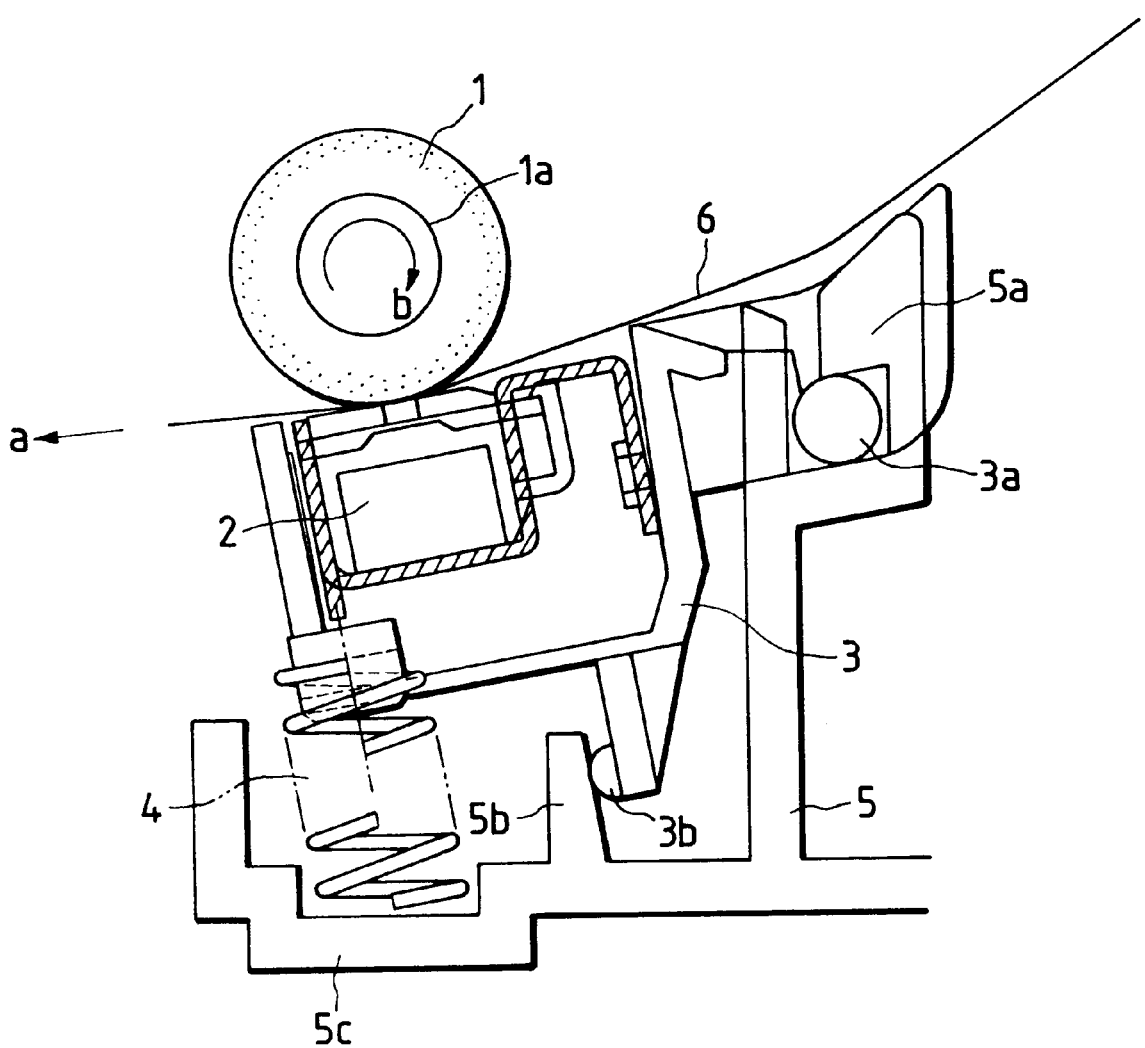
FIG. 1 is a sectional view of an original reading portion of an original reading apparatus having a sheet conveying apparatus according to the present invention, showing a condition that an original exists in the original reading portion.

In FIG. 1, an original convey roller 1 acts as a convey rotary member for conveying an original 6 formed from paper sheet or synthetic resin film, and a surface of the original convey roller 1 is constituted by elastic material such as rubber. An image sensor of complete contact type (referred to as "contact sensor" or "CS" hereinafter) 2 acts as an original reading means for reading image information on the original 6. The CS 2 is locked and held by a holder 3 at several points along the entire width of the CS.

The holder 3 can be rocked around a rotation shaft 3a held by a holder rotation shaft holding portion (rotation shaft holding member) 5a, and the holder rotation shaft holding portion 5a serves to regulate a position of the rotation shaft 3a in a thickness-wise direction of the original 6 so that a position of the CS 2 in the thickness-wise direction of the original 6 is set when the CS 2 is opposed to the original convey roller 1 and further serves to slidably holding the rotation shaft 3a for sliding movement in an original conveying direction.

Positioning abutment portions 3b serve to regulate a position of the holder 3 in the original conveying direction. When the positioning abutment portions 3b abut against a holder stopper portion (positioning abutment member) 5b formed on a frame 5, the position of the holder 3 in the original conveying direction is regulated so that the position of the CS 2 in the original conveying direction is set when the CS 2 is opposed to the original convey roller 1. Incidentally, the holder rotation shaft 3a and the positioning abutment portions 3b are integrally formed with the holder 3.

An urging spring (biasing means) 4 for urging the holder 3 against the original convey roller 1 is held by an urging spring holding portion (biasing means holding member) 5c. The frame 5 acts as a base of the original reading apparatus and includes the above-mentioned holder rotation shaft holding portion 5a, holder stopper portion 5b, urging spring holding portion 5c, and an original convey roller supporting portion (not shown) acting as a convey rotary member support member for supporting the original convey roller 1.

The CS 2 and the holder 3 rotatably supported by the frame 5 and urged against the original convey roller 1 constitute a convey rotary member opposed member.

Figure 2:
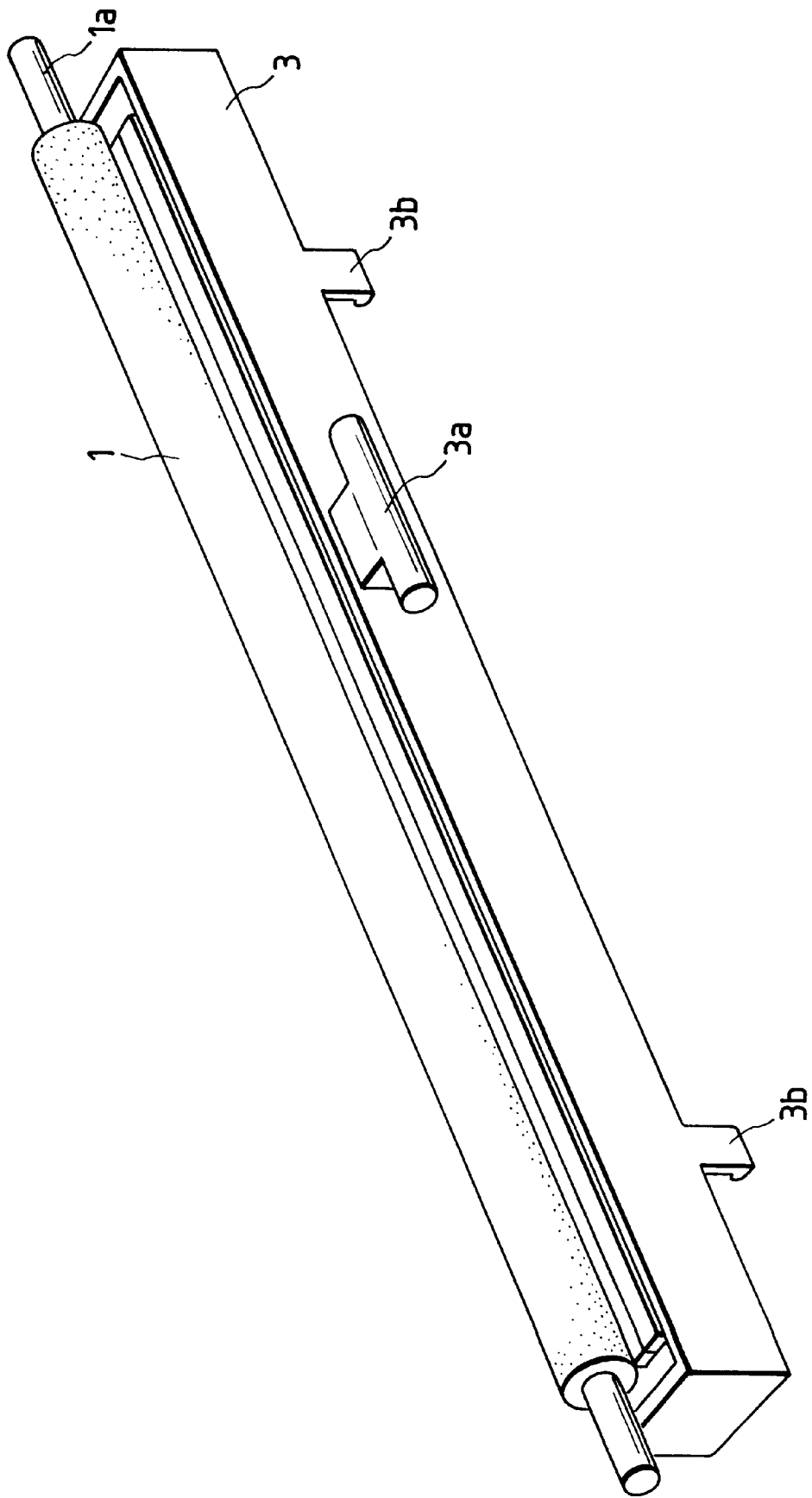
FIG. 2 is a schematic perspective view of an original convey roller (convey rotary member) and a CS holder (convey rotary member opposed member) of the sheet conveying apparatus.

As shown in FIG. 2, the rotation shaft 3a of the holder 3 is disposed between both ends of the holder 3 in a width-wise direction of the original 6 to be conveyed. The reason for providing the single rotation shaft 3a of the holder 3 is that an original conveying force of the original convey roller 1 is made uniform in the width-wise direction of the original 6. For example, if two holder rotation shafts 3 are provided (for example, at both ends of the holder), in dependence upon the accuracy of parts, torsion is generated between the rotation shafts 3a of the holder 3 and the shaft 1a of the original convey roller 1, with the result that the urging force of the CS 2 against the original convey roller 1 becomes uneven in the width-wise direction of the original 6. Consequently, the proper original conveying ability cannot be obtained.

Further, two holder positioning abutment portions 3b are provided in a predetermined spaced relation along the width-wise direction of the original 6, so that, when the two holder positioning abutment portions 3b abut against the holder stopper portion 5b, a reading line of the CS 2 is closely contacted with the surface of the original convey roller 1 with high accuracy. With this arrangement, the holder 3 is prevented from rotating in the conveying plane of the original 6. If the single holder positioning abutment portion 3b is used, when the holder 3 biased by the urging spring 4 is rotated to abut the holder positioning abutment portion 3b against the holder stopper 5b and when the CS 2 is subjected to the conveying force from the original convey roller 1, the delicate balance between the conveying forces is lost, thereby rotating the holder 3 in the conveying plane of the original 6.

When the original 6 is inserted into the original reading apparatus having the above-mentioned construction, the original convey roller 1 is rotated in a direction shown by the arrow b in FIG. 1 by detection of sensor(s) (not shown) and/or by manual input through an operation portion (not shown), thereby conveying the original 6 in a direction shown by the arrow a in FIG. 1. In this case, although the position of the holder rotation shaft 3a in the thickness-wise direction of the original 6 is regulated by the holder rotation shaft holding portion 5a of the frame 5, the rotation shaft 3a can be shifted in the original conveying direction. Further, since the CS 2 is urged against the original convey roller 1 through the holder 3 by the urging spring 4, the CS 2 and the holder 3 are shifted in the original conveying direction a when subjected to the conveying force from the original convey roller 1. And, when the holder positioning abutment portions 3b abut against the holder stopper 5b, the position of the CS 2 in the original conveying direction is determined.

Figure 3:
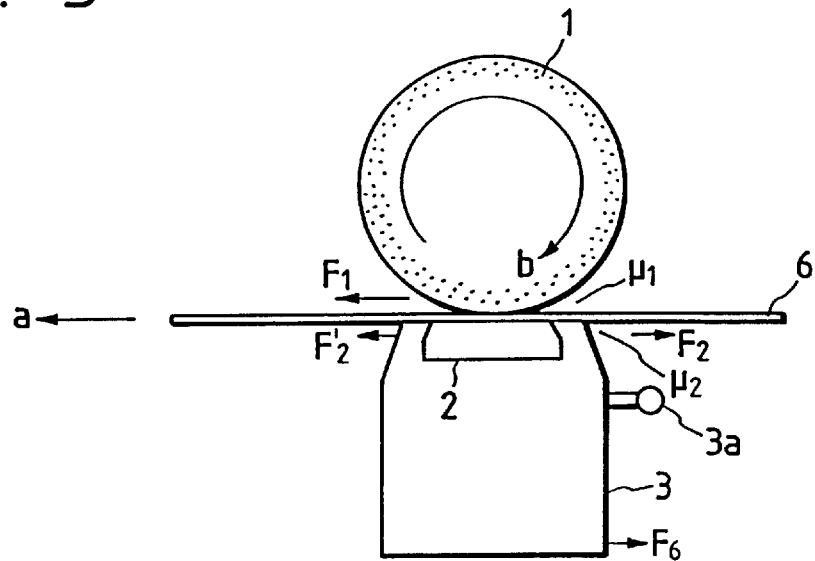
FIG. 3 is a schematic illustration showing various forces generated on the original convey roller, original and CS (reading means) when the original convey roller is rotated.

When the original 6 is inserted between the original convey roller 1 and the CS 2, as shown in FIG. 3, the original 6 is subjected to a conveying force F1 (directing toward the original conveying direction a) from the original convey roller 1 due to friction between the original convey roller 1 and the original 6 and is also subjected to a resistance force F2 (direction toward a direction opposite to the original conveying direction a) due to friction between the original 6 and the CS 2.

When a relation F1>F2 is established, the original 6 is conveyed in the original conveying direction a. To this end, the coefficient $\mu1$ of friction between the original convey roller 1 and the original 6 must be greater than the coefficient $\mu2$ of friction between the original 6 and the CS 2 ($\mu1 > \mu2$). In order to surely convey various kinds of originals, the surface of the original convey roller 1 is constituted by elastic material such as rubber. The CS 2 and the holder 3 for holding the CS are subjected to a conveying force F12 (in the original conveying direction a) corresponding to the above-mentioned resistance force F2 due to the friction between the CS 2 and the original 6.

Figure 4:
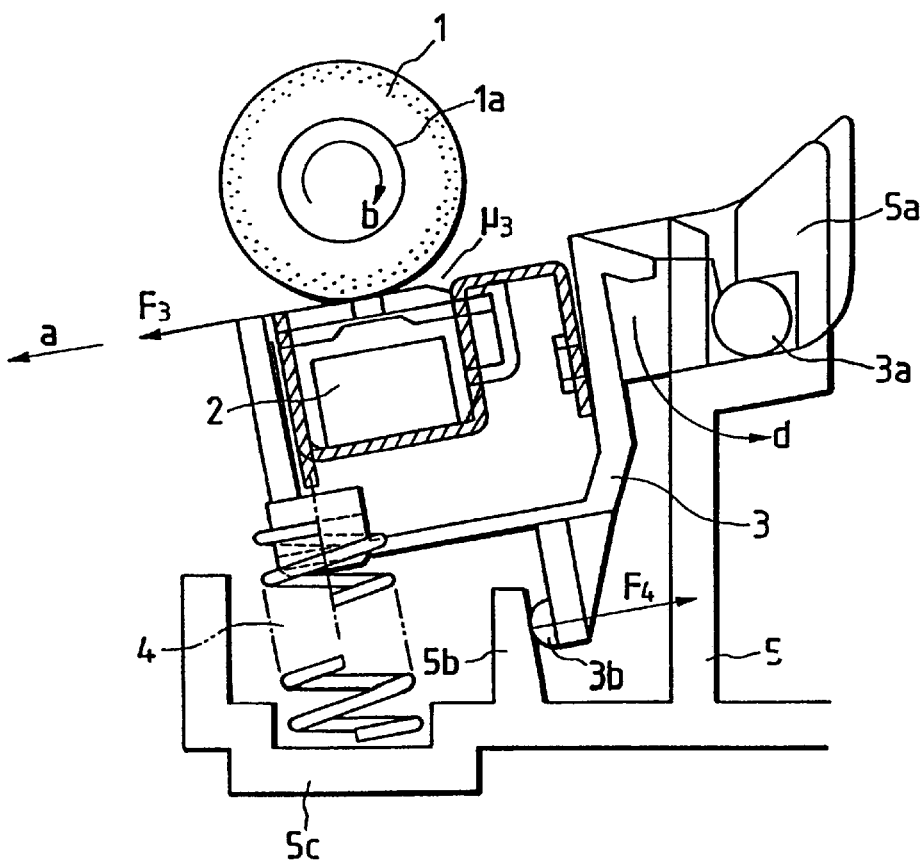
FIG. 4 is a sectional view of the original reading portion, showing a condition that an original does not exist in the original reading portion.

When the original 6 is not present between the original convey roller 1 and the CS 2, as shown in FIG. 4, the CS 2 is subjected to a conveying force F3 from the original convey roller 1. Since an image information reading surface of the CS 2 is constituted by glass and the surface of the original convey roller 1 is constituted by rubber, the coefficient $\mu3$ of friction between the original convey roller 1 and the CS 2 becomes greater than the friction coefficient $\mu2$ ($\mu3 > \mu2$), thereby establishing a relation F3>F2. Thus, when there is no original 6 between the original convey roller 1 and the CS 2, the conveying force acting on the CS 2 will be maximum. Accordingly, when there is no original 6 between the original convey roller 1 and the CS 2, any load acting on an original convey driving system (not shown) such as a motor (drive source) is also maximized.

As shown in FIG. 4, when there is no original 6 between the original convey roller 1 and the CS 2, the following two external forces act on the CS 2 and the associated holder 3. That is to say, the CS 2 and the associated holder 3 are subjected to the conveying force F3 directing toward the original conveying direction a and received from the original convey roller 1 at a contact point between the original convey roller 1 and the CS 2, and a drag force F4 received from the holder stopper 5b through the holder positioning abutment portions 3b. The drag force F4 has the same magnitude as the conveying force F3 but directs toward the direction opposite to the original conveying direction a.

As shown in FIG. 4, since the holder positioning abutment portions 3b on which the drag force F4 acts are positioned below the contact point (between the original convey roller 1 and the CS 2) on which the conveying force F3 acts, the CS 2 and the associated holder 3 are subjected to couple of forces tending to rotate the CS 2 and the associated holder 3 around the holder rotation shaft 3a in a direction shown by the arrow d in FIG. 4, due to the forces F3 and F4. Under the action of the couple of forces, the CS 2 and the holder 3 are rotated around the holder rotation shaft 3a in the direction d, thereby decreasing the urging force of the CS against the original convey roller 1.

When the urging force is decreased as mentioned above, torque required for rotating the original convey roller 1 can be reduced, and, thus, the load acting on the drive system (not shown) of the original reading apparatus can be reduced.

Figure 5:
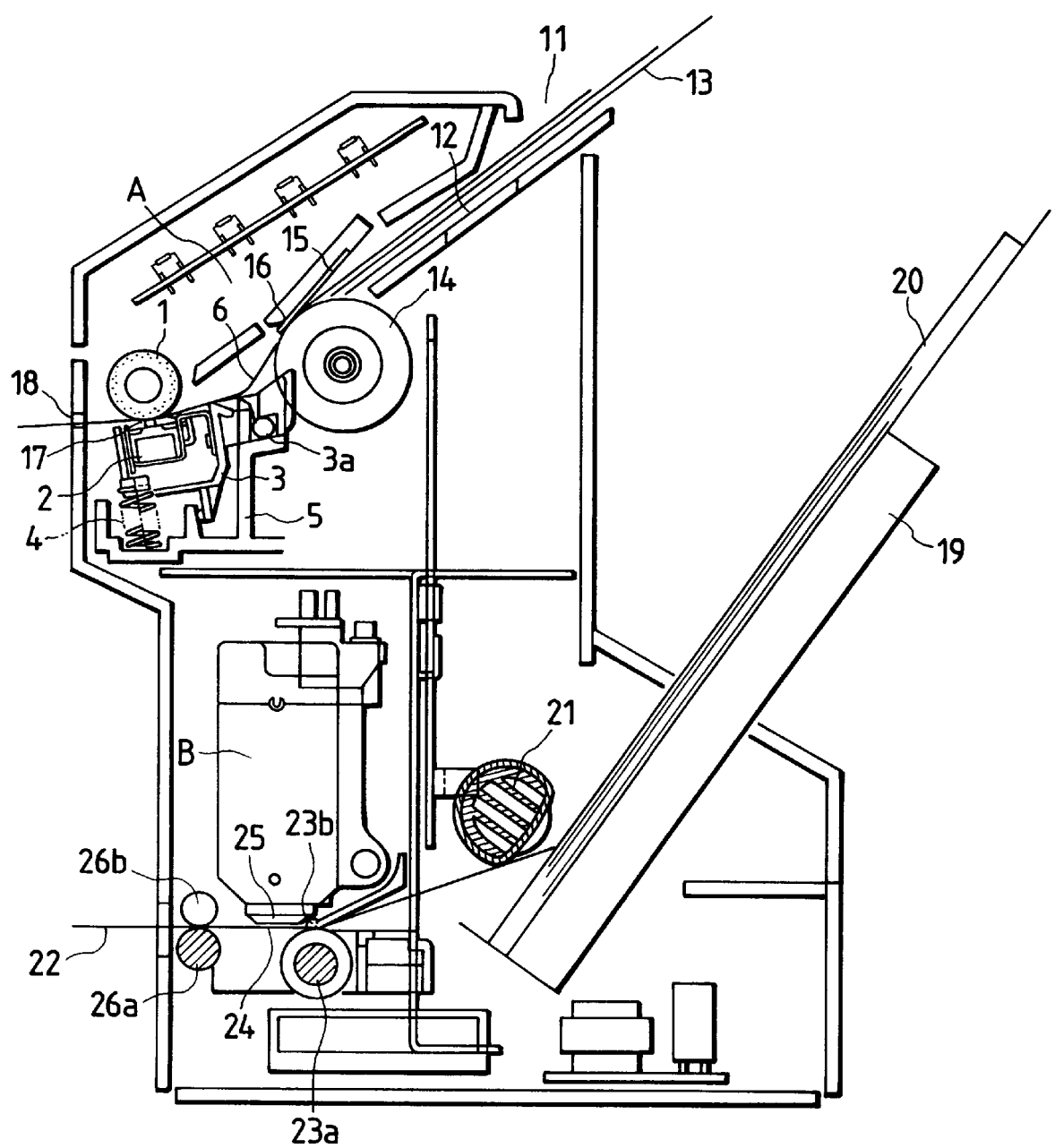
FIG. 5 is a sectional view of a main portion of a facsimile system having the original reading apparatus according to the present invention.

Next, a facsimile system using the above-mentioned original reading apparatus having the sheet conveying apparatus will be explained with reference to FIG. 5, and advantages obtained by the present invention will be described in comparison with the above-mentioned conventional apparatus on the basis of test data. As shown in FIG. 5, the facsimile system comprises an upper reading system A and a lower recording system B.

In the reading system A, the original is conveyed as follows. First of all, when an original bundle 13 is inserted into an original insertion path 12 inclined by an angle of 30–40° with respect to a horizontal plane through an original insertion opening 11 of the facsimile system, the original bundle is detected by an original presence/absence sensor (not shown), and a signal from the sensor is sent to a control portion of the facsimile system, thereby ascertaining the presence of the original. Further, the original bundle 13 is inserted until it reaches an original separation portion 16 including an original separation piece 15 opposed to an original separation roller 14 and urged against the original separation roller 14 by a biasing means (not shown).

By depressing a start key (not shown) on the operation portion, a reading drive system is operated to rotate the original separation roller 14 in an original bundle conveying direction. The original bundle is pinched between the rotating original separation roller 14 and the original separation piece 15 urged against the original separation roller 14, thereby separating the originals one by one. The separated original 6 is conveyed by the rotating original separation roller 14. Meanwhile, a tip end of the original 6 is detected by an original end detection sensor.

The original 6 is further conveyed by the rotating original separation roller 14 to reach an image information reading portion 17 including a CS 2 and an original convey roller 1 opposed to the CS 2. The CS 2 is urged against the original convey roller 1 by an urging spring 4. The original 6 reached the image information reading portion 17 is inserted between the original convey roller 1 and the CS 2, so that the image information on the original is read by the CS 2 while the original 6 is being conveyed by the rotating original convey roller 1 in an original conveying direction. Then, a trail end of the original is detected by the original end detection sensor, and the original is discharged out of the facsimile system by the original convey roller 1 through an original discharge opening 18.

On the other hand, in the recording system B, a recording sheet is conveyed as follows. A recording sheet stack 20 rested on a sheet stacking plate 19 is separated one by one by a separation roller 21. A recording sheet 22 separated by the separation roller 21 is conveyed up to a pair of convey rollers 23a, 23b opposed to each other with the interposition of a recording sheet convey path. Then, the recording sheet is conveyed by the pair of convey rollers 23a, 23b up to an image recording position 24, where the recording sheet 22 is temporarily stopped and held in the image recording position 24. In the image recording position 24, ink is discharged from discharge openings of an ink jet recording head 25 disposed a confronting relation to an image record surface of the recording sheet 22, with the result that ink droplets are adhered to the image record surface of the recording sheet 22, thereby forming an image. After one-line recording is finished, the pair of convey rollers 23a, 23b are rotated again to convey the recording sheet by a predetermined amount. Then, the recording sheet 22 is stopped again, and next one-line recording is effected.

After one page image recording is finished by repeating the above process, the recording sheet 22 is discharged out of the facsimile system by a pair of discharge rollers 26a, 26b opposed to each other with the interposition of the recording sheet convey path. In this way, the recorded recording sheets are stacked in the vicinity of a discharge opening with imaged surfaces facing upside.

In FIG. 5, the holder rotation shaft 3a is disposed at an upstream side of the image information reading portion 17 (i.e., a contact point between the original convey roller 1 and the CS 2) in the original conveying direction. Thus, it is not necessary to dispose constructional elements such as the holder at a downstream side of the image information reading portion 17 in the original conveying direction. Accordingly, the original convey roller 1, CS 2 and holder 3 can be disposed in the vicinity of the original discharge opening 18, thereby making the facsimile system compact.

Further, the holder rotation shaft 3a is disposed at the CS 2 side rather than the original convey roller 1 side in the thickness-wise direction of the original. Thus, the original passing area can be provided at the original convey roller 1 side rather than the CS 2 side in the thickness-wise direction of the original. That is to say, since the original passing area can be provided so that the holder rotation shaft 3a and the rotating action of the holder 3 do not interfere with the original convey path, the holder rotation shaft 3a can be disposed within the original passing area in the thickness-wise direction of the original, thereby making the facsimile system compact.

Further, as shown in FIGS. 1, 4 and 5, since the holder rotation shaft holding portion 5a for holding the holder rotation shaft 3a, the holder stopper portion 5b against which the holder positioning abutment portions 3b abut, the urging spring holding portion 5c for holding the urging spring 4, and an original convey roller supporting member (not shown) for rotatably supporting the original convey roller 1 are integrally formed with the frame 5, the number of parts can be reduced, thereby making the facsimile system cheaper.

Next, in the above-mentioned original reading apparatus, advantages obtained by the present invention will be described in comparison with the above-mentioned conventional apparatus on the basis of test data.

Figure 6:
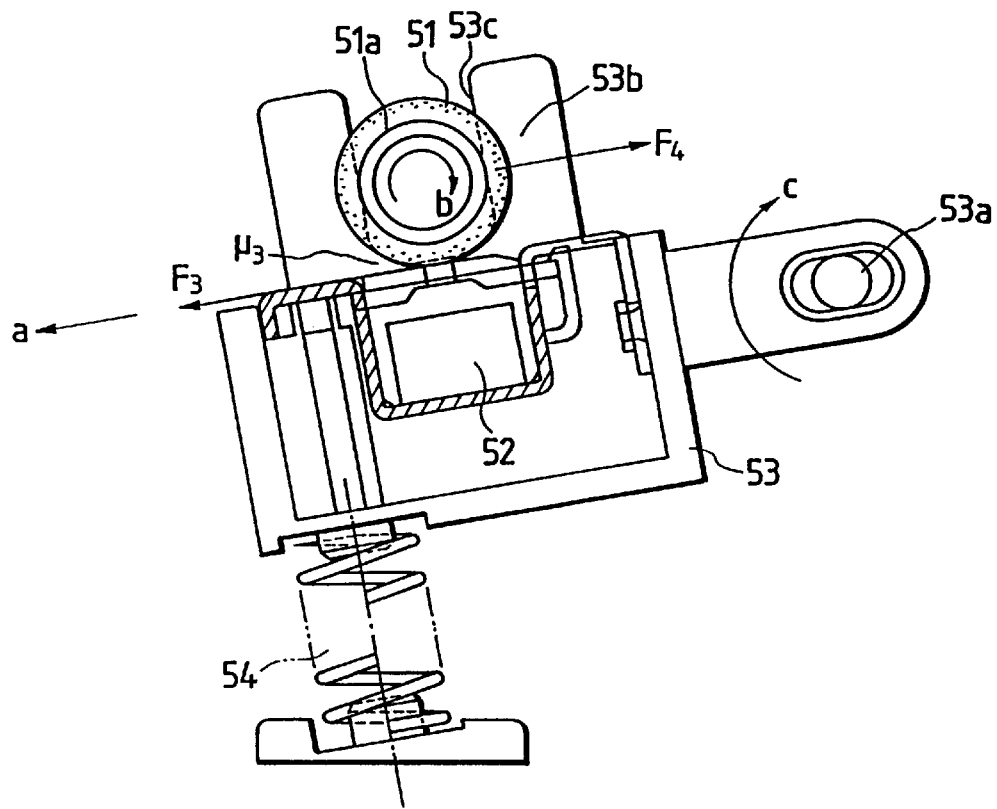
FIG. 6 is a sectional view of a conventional original reading apparatus, showing a condition that an original does not exist in an original reading portion.

Regarding original reading apparatuses including the original convey rollers 1, 51 having the surfaces constituted by rubber material of predetermined hardness, the CS 2, 52 having the image information reading surfaces constituted by glass, and the urging springs 4, 54 for urging the CS 2, 52 against the original convey rollers 1, 51 with an urging force of about 20[N], respectively, in the conventional apparatus shown in FIG. 6, with the arrangement in which the CS 52 is positioned by fitting the U-shaped notch 53c of the guide portion 53b of the holder 53 on the shaft 51a of the original convey roller 51, when the original was not existed between the original convey roller 51 and the CS 52, the rotation torque of the original convey roller 51 was 8[N·cm].

However, in the original reading apparatus according to the present invention having a similar construction, as shown, in FIG. 4, with the arrangement in which the CS 2 is positioned by abutting the holder positioning abutment portions 3b disposed below the contact point between the original convey roller 1 and the CS 2 against the holder stopper portion 5b, when the original was not existed between the original convey roller 1 and the CS 2, the rotation torque of the original convey roller 1 was 5[N·cm].

In this way, among force components of the couple of forces generated on the CS and the holder by acting the conveying force F3 of the original convey roller on the CS, by locating the position at which the force component F4 acts below the contact position between the original convey roller and the CS in the thickness-wise direction of the original, the torque required for rotating the original convey roller can be reduced, and, thus, the load acting on the drive system of the original reading apparatus can be reduced. Incidentally, the force F4 acts toward a direction opposite to the direction in which the conveying force F3 of the original convey roller generated at a position for regulating the position of the holder in the original conveying direction acts on the CS and the holder.

Figure 7:
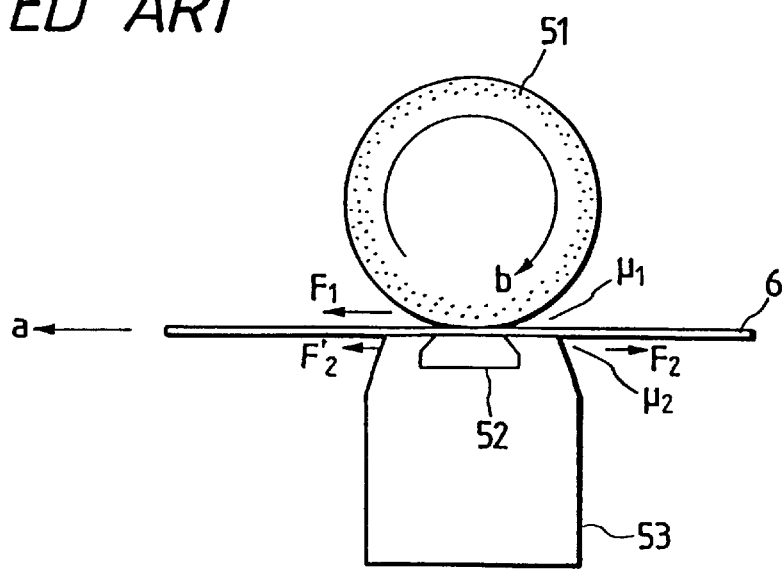
FIG. 7 is a schematic illustration showing various forces generated on an original convey roller, original and CS (reading means) when the original convey roller is rotated, in the conventional original reading apparatus.

As mentioned above, even when the original exists between the original convey roller and the CS, due to the friction between the original 6 and the glass surface of the CS, as shown in FIGS. 3 and 7, the CS and the associated holder are subjected to the conveying force F2.

According to the arrangement of the present invention, as is in the case where there is no original between the original convey roller and the CS, even when the original exists between the original convey roller and the CS, since the drag force F6 (FIG. 3) having the same magnitude as the conveying force F2 and directing toward the direction opposite to the original conveying direction a acts on the holder positioning abutment portions 3b, the CS and the holder are subjected to the couple of forces tending to rotate the CS and the holder around the holder rotation shaft 3a in the direction d in FIG. 4. However, since the conveying force F2 (in case of presence of original) is considerably smaller than the conveying force F3 (in case of absence of original), when the original 6 exists between the original convey roller and the CS, the couple of forces d due to the forces F2 and F6 also becomes smaller. Accordingly, the urging force for urging the CS 2 and the holder 3 against the original convey roller 1 is almost not decreased, with the result that the original conveying ability is not worsened.

With the arrangement as mentioned above, in comparison with the test data regarding both original reading apparatuses in the case of presence of original, the rotational torque of the original convey roller 51 of the conventional original reading apparatus was 3[N·cm], and the rotational torque of the original convey roller 1 of the original reading apparatus according to the present invention was also 3[N·cm].

In this way, among the force components of the couple of forces generated by the conveying force F2 acting on the CS and the holder by acting the conveying force F1 of the original convey roller on the CS via the original 6, even when the position at which the force (acting toward a direction opposite to the direction in which the conveying force F2 of the original convey roller generated at a position for regulating the position of the holder in the original conveying direction acts on the CS and the holder) acts is located below the contact position between the original convey roller and the CS in the thickness-wise direction of the original, the torque required for rotating the original convey roller is almost not changed, thereby not affecting an influence upon the original conveying ability. Thus, the load acting on the drive system of the original reading apparatus can be reduced without worsening the original conveying ability.

What is claimed is:

1. A sheet conveying apparatus comprising:
   a rotary member for conveying a sheet;
   an opposed member;
   biasing means for biasing said opposed member toward said rotary member, the sheet being conveyed between said rotary member and said opposed member by rotation of said rotary member;
   a holding member for supporting said opposed member; and
   a positioning member for positioning said holding member;
   wherein, when said rotary member is rotated and said opposed member is subjected to an urging force in a direction toward a rotational direction of said rotary member due to a friction between said rotary member and said opposed member said positioning member receives the force to prevent movement of said opposed member in the rotational direction, and
   wherein said holding member supports said opposed member so that, when movement of said opposed member in the rotational direction is prevented, a rotational movement in a direction away from said rotary member is generated by the force so that the urging force to said opposed member against said rotary member is decreased.

2. A sheet conveying apparatus according to claim 1, wherein said opposed member is rockably supported by said holding member.

3. A sheet conveying apparatus according to claim 2, wherein said holding member is disposed toward said opposed member with respect to a contact position between said rotary member and said opposed member.

4. A sheet conveying apparatus according to claim 3, wherein said holding member is a member for rotatably supporting said opposed member and is disposed upstream of said rotary member.

5. A sheet conveying apparatus according to claim 1, wherein, as a force acting in a rotational direction increases, the urging force between the rotary member and the opposed member decreases greatly.

6. A sheet conveying apparatus comprising a rotary member for conveying a sheet, and an opposed member biased toward said rotary member by a biasing means, the sheet is conveyed through a contact position between said rotary member and said opposed member by rotation of said rotary member,
   characterized by that:
   a holding member disposed upstream of said contact position for rotatable supporting said opposed member; and
   a positioning member disposed below said contact position for regulating a position of said opposed member in a sheet conveying direction, said positioning member, when said opposed member receives the force in a conveying direction by rotation of said rotary member, receives the force.

7. A sheet conveying apparatus comprising a rotary member supported by a shaft to convey a sheet, and an opposed member rotatable around a rotation shaft and biased toward said rotary member by a biasing means, the sheet is conveyed between said rotary member and said opposed member by rotation of said rotary member, characterized by that:
- a holding member for regulating a position of said rotation shaft of said opposed member in a thickness direction of the sheet, and
- a positioning member for regulating a position of said opposed member in a sheet conveying direction, when said rotary member is rotated in a condition that the sheet does not exist between said rotary member and said opposed member, said opposed member is subjected to a force in a direction toward a rotational direction of said rotary member due to a friction between said rotary member and said opposed member to abut it against said positioning member to position said opposed member in the sheet conveying direction, and, a moment around the rotation shaft generated at a contact position between said opposed member and said positioning member due to the rotation of said rotary member act to separate said opposed member from said rotary member.

8. A sheet conveying apparatus according to claim 7, wherein said rotary member has a surface formed from elastic material.

9. A sheet conveying apparatus according to claim 7, wherein the rotation shaft of said opposed member is positioned upstream of said rotary member in the sheet conveying direction.

10. A sheet conveying apparatus according to claim 7, wherein the rotation shaft of said opposed member is positioned toward the opposed member with respect to said rotary member in the thickness direction of the sheet to be conveyed.

11. A sheet conveying apparatus according to claim 7, wherein at least two among a support member for supporting said rotary member, a hold member for holding said biasing means, said holding member and said positioning member are integrally formed as an unit.

12. An original reading apparatus having a sheet conveying apparatus according to claim 1, 7 or 10, wherein said rotary member acts as an original convey rotary member, and said opposed member acts as an original reading means.

13. A sheet conveying apparatus comprising:
- a rotary member for conveying a sheet;
- an opposed member;
- biasing means for biasing said opposed member toward said rotary member, the sheet being conveyed between said rotary member and said opposed member by rotation of said rotary member;
- a holding member for supporting said opposed member; and
- a positioning member for positioning said holding member, wherein, when said rotary member is rotated and said opposed member is subjected to an urging force in a direction toward a rotational direction of said rotary member due to a friction between said rotary member and said opposed member or a friction between the sheet and said opposed member, said positioning member receives the force to prevent movement of said opposed member in the rotational direction, and wherein said holding member supports said opposed member so that, when movement of said opposed member in the rotational direction is prevented, a rotational movement in a direction away from said rotary member is generated by the force so that the urging force to said opposed member against said rotary member is decreased.

* * * * *

UNITED STATES PATENT AND TRADEMARK OFFICE
CERTIFICATE OF CORRECTION

PATENT NO. : 5,903,365

DATED : May 11, 1999

INVENTOR(S): NAOHIRO IWATA, ET AL.

It is certified that error appears in the above-identified patent and that said Letters Patent is hereby corrected as shown below:

COLUMN 1,
Line 56, "F12" should read --F'2--.

COLUMN 5,
Line 2, "holding" should read --hold--.

COLUMN 6,
Line 29, "F12" should read --F'2--.

COLUMN 8,
Line 2, "disposed" should read --disposed in--; and
Line 63, "existed" should read --existing--.

COLUMN 10,
Line 54, "rotatable" should read --rotatably--.

COLUMN 12,
Line 2, "an" should read --a--.

Signed and Sealed this

Thirtieth Day of November, 1999

Attest:

Attesting Officer

Q. TODD DICKINSON

Acting Commissioner of Patents and Trademarks